United States Patent
Jeong-Hun

[11] Patent Number: 5,389,978
[45] Date of Patent: Feb. 14, 1995

[54] NOISE ELIMINATIVE CIRCUIT EMPLOYING A CORING CIRCUIT

[75] Inventor: Kim Jeong-Hun, Yangcheon, Rep. of Korea

[73] Assignee: Samsung Electronics Co., Ltd., Kyonggi-do, Rep. of Korea

[21] Appl. No.: 24,308

[22] Filed: Mar. 1, 1993

[30] Foreign Application Priority Data

Feb. 29, 1992 [KR] Rep. of Korea .................. 92-3401

[51] Int. Cl.⁶ ............................................. H04N 5/213
[52] U.S. Cl. ..................................... 348/622; 348/623
[58] Field of Search ................... 348/607, 622, 623; 358/336, 340; .H04N 5/213

[56] References Cited

U.S. PATENT DOCUMENTS 4,523,230  6/1985  Carlson et al. ................ 348/623
4,709,269  11/1987  Ozaki ............................ 348/622
5,214,510  5/1993  Kobayashi .................. 348/607 X
5,278,638  1/1994  Nakada ........................ 348/607

*Primary Examiner*—Victor R. Kostak
*Attorney, Agent, or Firm*—Sughrue, Mion, Zinn, Macpeak & Seas

[57] ABSTRACT

A noise eliminative circuit for eliminating noise components contained in an input image signal in which a high-frequency noise component is eliminated through a coring circuit, and a low-frequency noise component is selectively eliminated by horizontal and vertical correlation, without a damage to the input image signal. A coring circuit is employed for a horizontal high-frequency component of an image signal to remove a minute noise component, and an impulse noise elimination method is applied to a remaining component of the image signal to eliminate the noise component which is also removed in accordance with a user's selection of the high-frequency band.

7 Claims, 6 Drawing Sheets

NOISE ELIMINATIVE CIRCUIT EMPLOYING A CORING CIRCUIT

FIELD OF THE INVENTION

The present invention relates to a noise eliminative circuit for eliminating noise components contained in an input image signals, and more particularly, to a noise eliminative circuit in which a high-frequency noise component is eliminated through a coring and a low-frequency noise component is selectively eliminated by a horizontal and vertical correlation, without damage to input image signals. The present disclosure is based on the disclosure of Korean Patent Application No. 92-3401 filed Feb. 29, 1992, which disclosure is incorporated herein by reference.

BACKGROUND OF THE INVENTION

In general, noise intermixed to a TV signal or a signal recorded or reproduced on or from a magnetic tape for a video tape recorder causes noise contamination in an operating state of a television set or a recorded state of the magnetic tape. Particularly, in a case of such a TV signal, serious contamination is likely to occur at a weak electric field of the signal.

Such serious noise is typically an impulse noise such as a white impulse noise and a black impulse noise. Also, a minute noise level contained in a high-frequency component of the TV signal causes a problem in receiving the TV signal.

According to a typical method for eliminating such an impulse noise, a fixed window is set in the signal containing the noise component and, then, the noise is simply averaged or substituted by an average value or by proper pixels by means of a median filter.

With such a conventional method, however, a vertical high frequency component of the image signal is undesirably damaged and, hence, the image is confused unexpectedly.

SUMMARY OF THE INVENTION

Accordingly, an object of the present invention is to provide a noise eliminative circuit in which a coring is employed for a horizontal high-frequency component of an image signal to remove a minute noise component, and an impulse noise elimination method is applied to a remaining component of the image signal, thereby eliminating noise in a high frequency band selected by an user.

To achieve the above object, according to an aspect of the present invention, there is provided a noise eliminative circuit comprising:

high pass filters having different cut-off frequencies respectively for passing high-frequency components of an input image signal;
a multiplexer for selectively outputting the input image signal and the outputs signals of the high pass filters in accordance with a selection of a switch control portion;
a coring portion for receiving an output signal of the multiplexer and for eliminating a minute noise level from the high-frequency component;
a first adder for removing the selective signal output of the multiplexer from the input image signal;
an impulse noise eliminating portion for eliminating an impulse noise from the image signal output of the first adder; and
a second adder for adding the output signal of the impulse noise eliminating portion and the output of the coring portion to obtain an image signal in which noise is eliminated.

The above and other objects, features and advantages of the invention will be apparent from the following description taken with reference to the accompanying drawings.

DETAILED DESCRIPTION OF THE PREFERRED EMBODIMENT

Thereinafter, an embodiment of the present invention will be described in more detail.

Figure 1:
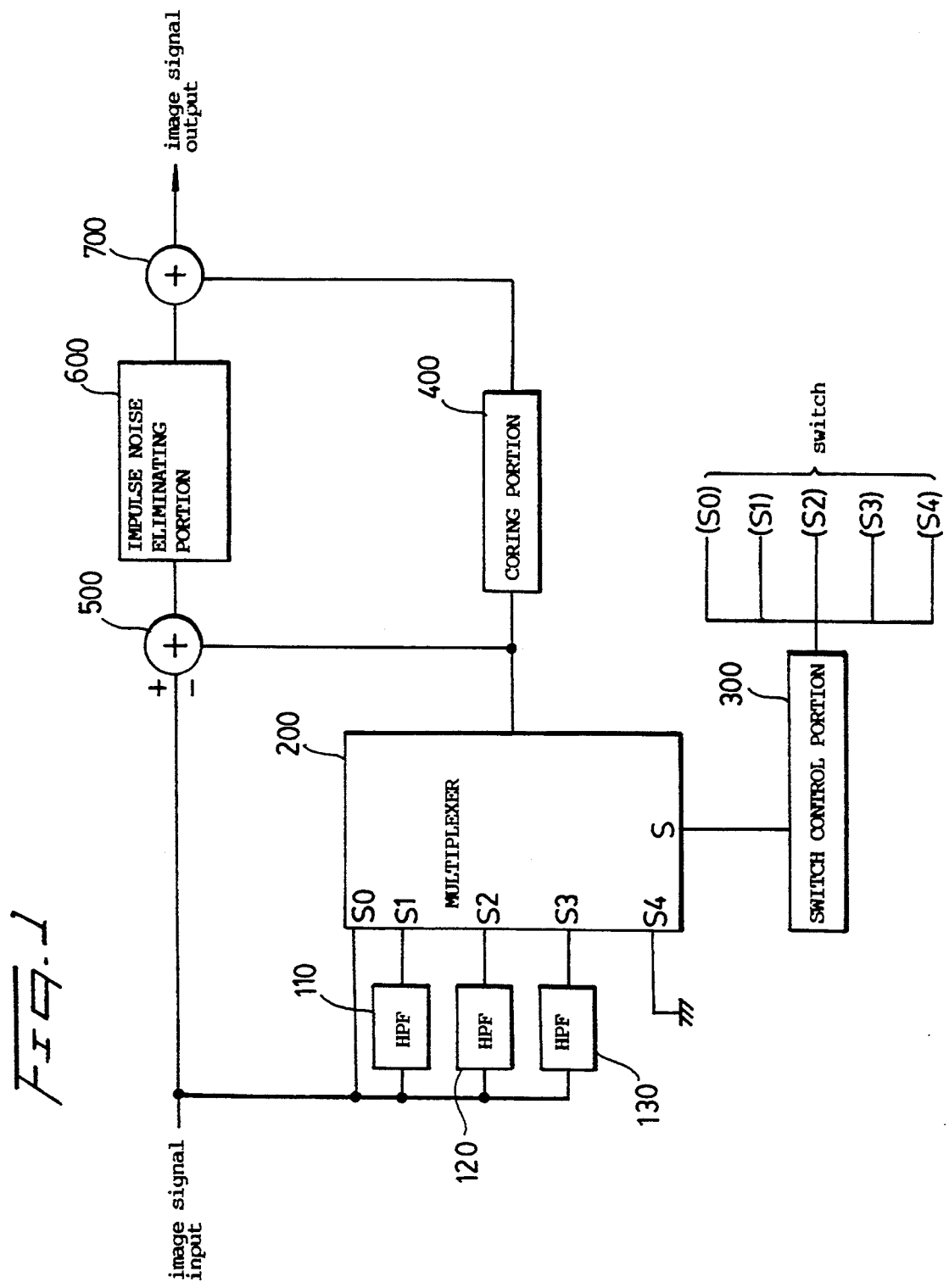
FIG. 1 is a block diagram of an noise eliminative circuit according to an embodiment of the present invention.

Referring to FIG. 1, high pass filters (HPF) generally designated 110, 120 and 130 each having a different cut-off frequency serve to pass high-frequency components of an image signal input. A multiplexer 200 receives at input ports S0 to S3 the image signal input and the output signals of the HPFs 110, 120 and 130 and selectively outputs them through an output port.

A switch control portion 300 is provided for selecting the output of the multiplexer 200, and a coring portion 400 receives the output signal of the multiplexer 200 and eliminates noise contained in the signal.

A first adder 500 removes the output signal of the multiplexer 200 from the input image signal. An impulse noise eliminating portion 600 eliminates impulse noise from the image signal output from the first adder 500.

A second adder 700 adds the output signal of the impulse noise eliminating portion 600 and the output signal of the coring portion 400 to produce the image signal output in which the noise is eliminated.

In the noise eliminating circuit according to the embodiment of the present invention thus constructed, the input image signal is directly supplied to the port S0 of the multiplexer 200 and simultaneously supplied to the ports S1, S2 and S3 after the high-frequency component is filtered by the high pass filters 110, 120 and 130. At this time, the outputs of the multiplexer 200 can be selected by switches of the switch control portion 300 in accordance with a liking of a user or picture quality, in such a way that any one of the input signals of the multiplexer 200 is selectively outputted. Since the cut-off frequencies of the high pass filters 110, 120 and 130 are different from each other, the different output signals of the multiplexer 200 can be obtained according to the selection of the input port S0, S1, S2 or S3.

The output signal of the multiplexer 200 is supplied to the coring portion 400 and the first adder 500. The coring portion 400 removes the noise contained in the high-frequency component of the image signal. That is, the image signal in which the noise of a minute level is suppressed can be produced by the coring portion 400.

Meanwhile, the signal in which the high-frequency component is reduced from the original input image signal is supplied from the first adder 500 to the impulse noise eliminating portion 600 which eliminates the impulse noise component in the image signal input. The output signal of the impulse noise eliminating portion 600 is provided to the second adder 700 which, in turn, adds the output signal of the impulse noise eliminating portion 600 and the output signal of the coring portion 400. Accordingly, the noise-eliminated image signal is produced from the second adder 700.

Meanwhile, when the switch control portion 300 is operated by the user to exchange the selection of the input port of the multiplexer 200, the coring is effected to the remaining high-frequency component to obtain the image signal having the noise-eliminated high-frequency component.

Figure 2:
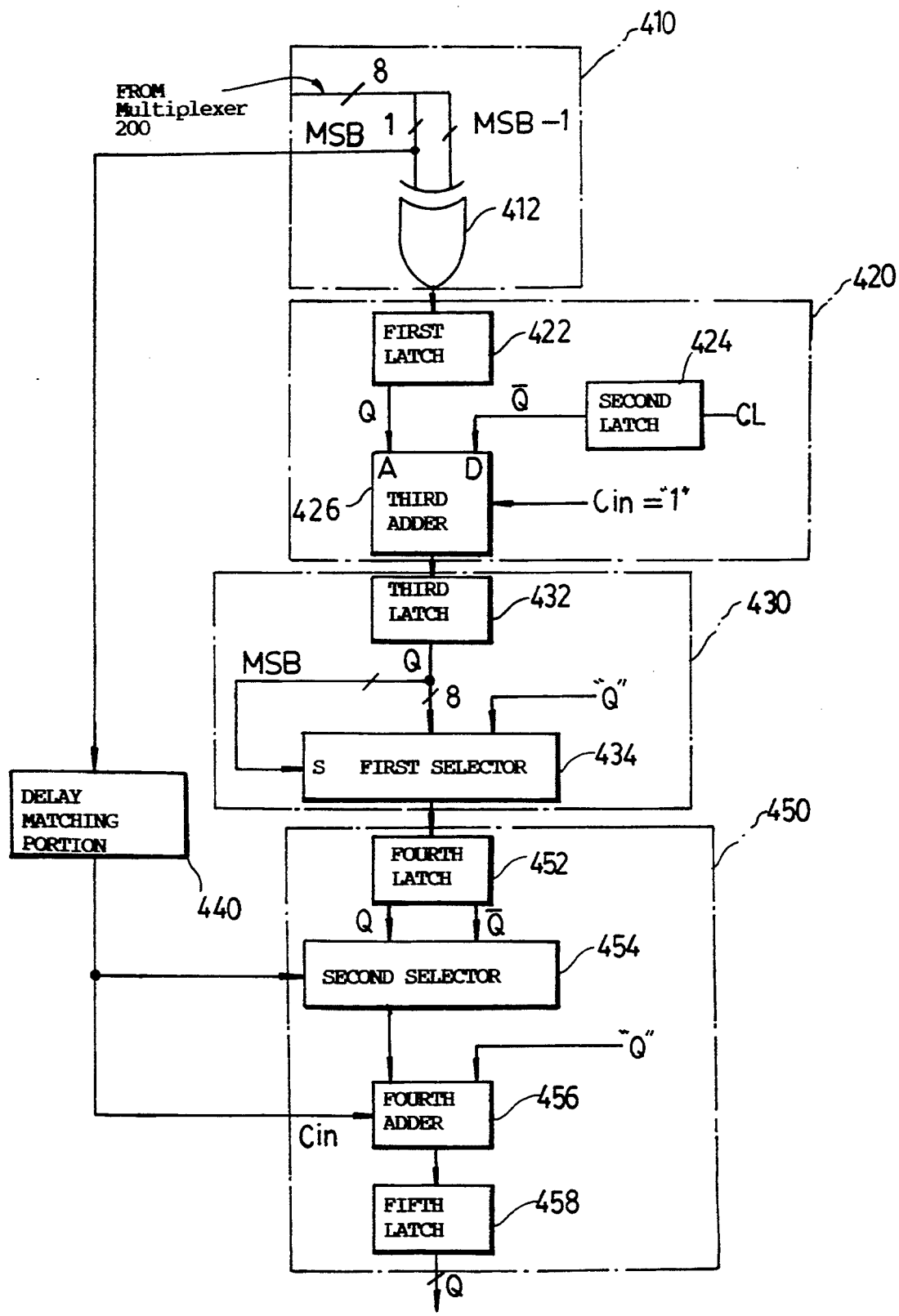
FIG. 2 is a block diagram showing an exemplary construction of a coring portion in FIG. 1.

Referring to FIG. 2, an example of the coring portion 400 in FIG. 1 is illustrated. In FIG. 2, an exclusive OR gate 412 in an absolute value circuit 410 receives the most significant bits MSB and MSB-1 of the output signal of the multiplexer 200 to calculate the absolute value.

A first latch 422 in a level adjusting portion 420 latches the output of the absolute value circuit 410 and a third adder 426 adds the output of the absolute value circuit 410 supplied through the first latch 422 and a coring level CL supplied through a second latch 424 to reduce the output level of the absolute value circuit 410 by the coring level.

A first selector 434 of a "0" level and below removing portion 430 outputs the signal below a "0" level in the output of the level adjusting portion 420, which is supplied through a third latch 432, as a value "0".

A fourth latch 452 of a sign resorting portion 450 outputs positive and negative signals Q and Q' of the output of the "0" level and below removing portion 430, and a second selector 454 selectively outputs the positive or negative signal Q or Q' of the fourth latch 452 by using the most significant bit MSB of the multiplexer 200 supplied through a delay matching portion 440.

A fourth adder 456 selectively adds the output of the second selector 454 and the "0" level by using the output of the multiplexer 200 supplied through the delay matching portion 440.

A fifth latch 458 temporarily latches and outputs the output signal of the fourth adder 456.

Now, a noise process effected by the coring portion will be described with reference to waveforms shown in FIG. 3.

Figure 3A:
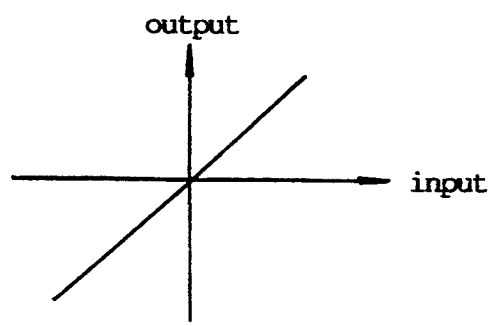
FIGS. 3A–3E are waveforms illustrating a noise eliminating process effected by the coring portion in FIG. 2.
Figure 3B:
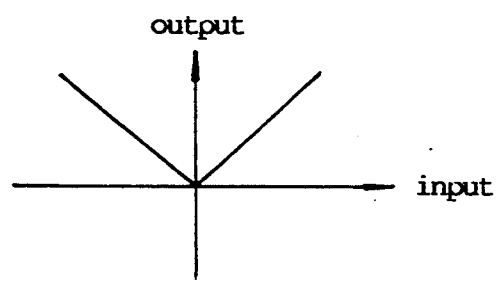

First, the values of the most significant bits MSB and MSB-1 (FIG. 3A) of the input signal are made absolute by the exclusive OR gate 412 of the absolute value circuit 410, as shown in FIG. 3B. The absolute value output of the absolute value circuit 410 is provided to the third adder 426 through the first latch 422 of the level adjusting portion 420 and then added to the coring level CL supplied through the second latch 424.

Figure 3C:
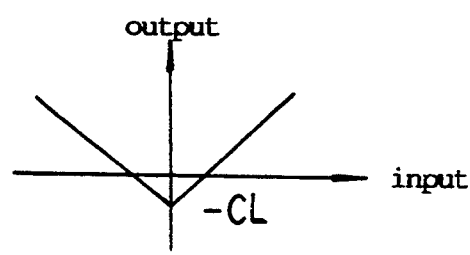
Figure 3D:
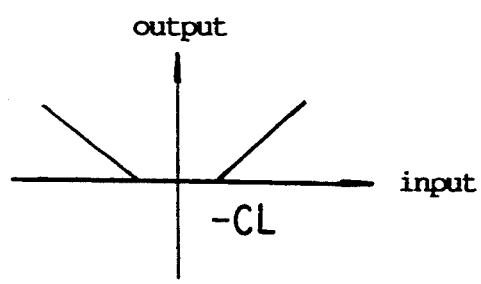

Accordingly, the absolute value is reduced by the coring level CL, as shown in FIG. 3C.

Consequently, the output (FIG. 3C) of the level adjusting portion 420 is inputted to the first selector 434 through the third latch 432 of the "0" level and below removing portion 430, which processes the signal below "0" level to be "0". Accordingly, the output signal (FIG. 3D) of the "0" level and below removing portion 430 is supplied to the fourth latch 452 of the sign recovering portion 450 and then produced as the positive and negative signals Q and Q'.

These signals Q and Q' are selectively outputted by the second selector 454 on the basis of the most significant bit MSB of the multiplexer 200.

That is, one of the positive and negative signals Q and Q' of the fourth latch 452 is selectively outputted in accordance with the sign of the input signal as shown in FIG. 3A.

Figure 3E:
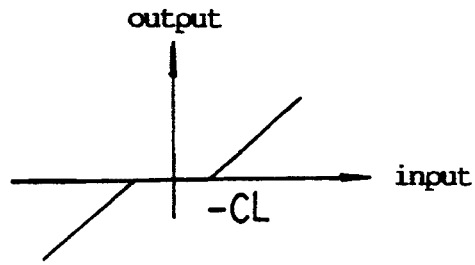

The fourth adder 456 selectively adds the positive or negative signal Q or Q' from the second selector 454 and the "0" level on the basis of the MSB of the multiplexer 200 supplied through the delay matching portion 400 and outputs the signal as shown in FIG. 3E. Therefore, the minute noise signal-reduced image signal can be obtained from the coring portion 400.

Figure 4:
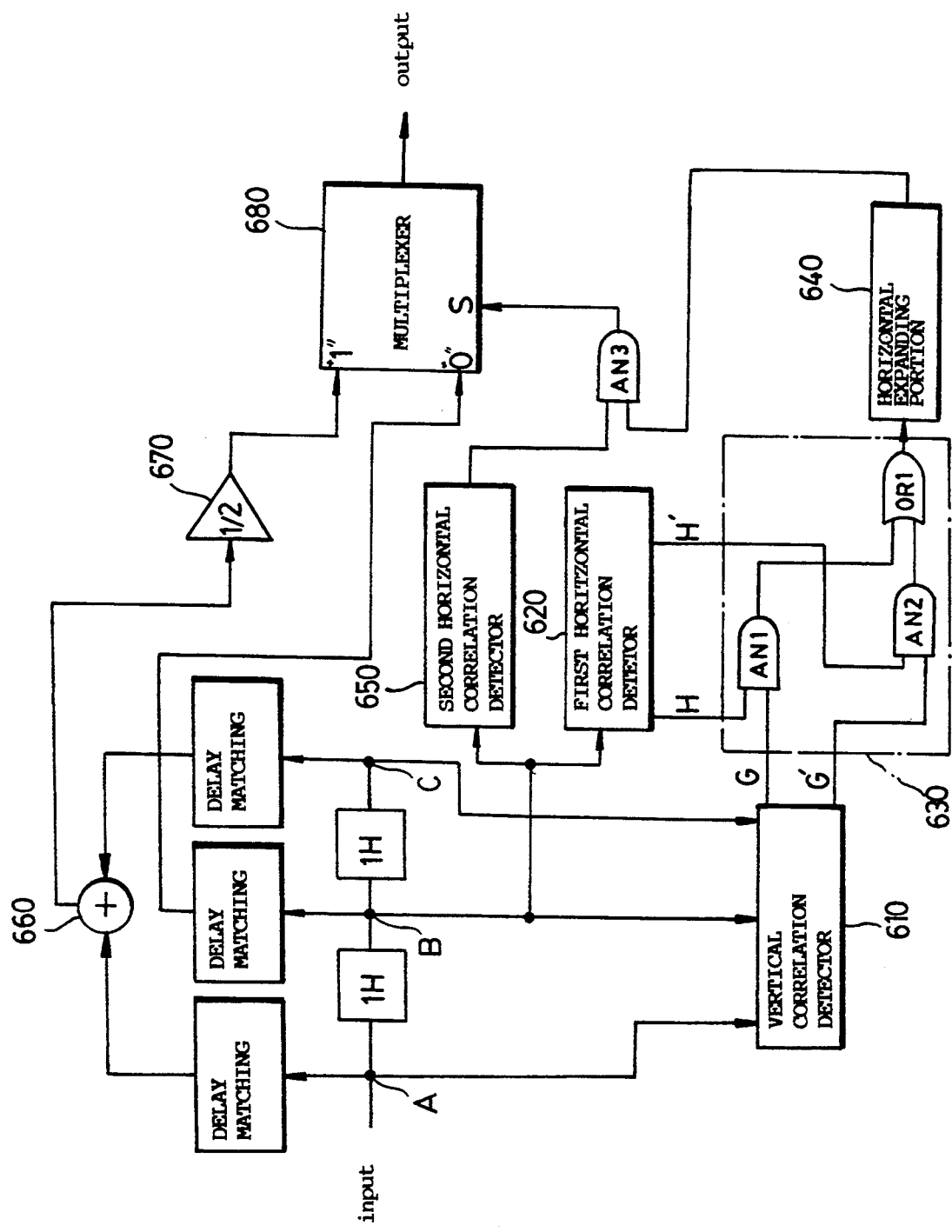
FIG. 4 is a block diagram of an impulse noise eliminating portion in FIG. 1.

FIG. 4 is a block diagram showing an example of the impulse noise removing portion 600 in FIG. 1.

Referring to FIG. 4, a vertical correlation detector 610 receives the output of the adder 500 of FIG. 1 (signal A) and 1H-delayed and 2-H delayed signals (signals B and C) thereof and detects vertical correlation therebetween. A first horizontal correlation detector 620 detects horizontal correlation between lines from the 1H delayed signal of the output signal of the adder 500, and a second horizontal correlation detector 650 receives the 1H delayed signal to produce a signal for determining that pixels are present in a width of the noise components.

A noise detector 630 logically calculates the outputs of the vertical and first horizontal correlation detectors 610 and 620 to obtain an intermediate value therebetween. A horizontal expanding portion 640 receives the output signal of the noise detector 630 and expands the center of the white or black impulse noise so as to determine the pixel around the center of the noise.

A fifth adder 660 adds the output from the first adder 500 (see FIG. 1) and the 2H-delayed signal thereof in a delay matching manner.

An amplifier 670 amplifies the output of the fifth adder 660 by ½ to obtain an average value. A multiplexer 680 receives the signal delay-matched with the output of the amplifier 670 and the 1H delayed signal of the input signal as an input signal and further receives the outputs of the horizontal expanding portion 640 and the second horizontal correlation detector 650 as a selection signals so as to select the output thereof (i.e., the output of AND gate AN3).

Accordingly, as the output of the first adder 500 (FIG. 1) is inputted to the impulse noise eliminating portion 600 (FIG. 4), the signal thus inputted is directly supplied to the vertical correlation detector 610 and, after the delay of 1H and 2H, supplied to the vertical correlation detector portion 610 as well. In this case, it is to be considered that the vertical correlation is not presented in the noise. Therefore, the vertical correlation detector 610 obtains a difference between the lines to detect the possibility G and G' of the white or black noise having a non-vertical correlation.

Meanwhile, the input signal is delayed by 1H and provided to the first and second horizontal correlation detectors 620 and 650. Then, the first horizontal correlation detector 620 obtains the difference between the pixel to be presently processed and two pixels before and after the pixel to detect the possibility H and H' of the white and black noise having non-horizontal correlation.

The output of the first horizontal correlation detector portion 620 obtained as described above is input to AND gates AN1 and AN2 together with the outputs G and G' of the vertical correlation detector 610. Consequently, the outputs of the AND gates AN1 and AN2 are supplied to the horizontal expanding portion 640 through an OR gate OR1. That is, if the possibility of the white or black noise is detected by both the vertical correlation detector 610 and the first horizontal correlation detector 620, then the noise detector 630 outputs a logic "1" to the horizontal expanding portion 640. At this time, the output of the AND gate AN1 in the noise detector 630 indicates a central point of the white noise having a relatively lower correlation in a horizontal and vertical direction, while the output of the AND gate AN2 indicates a central point of the black noise.

Therefore, if the input of the horizontal expanding portion 640 is set to 1 in logic, this means that it indicates the signal indicating the center of the black or white noise. Then, the horizontal expanding portion 640 determines whether the central point of the noise is presented in the output of the noise detector 630.

Meanwhile, the second horizontal correlation detector portion 650 to which the 1H-delayed input signal is supplied detects the correlation between the pixels to be presently processed.

The AND gate AN3 produces a logic "1" to be outputted to a selection port of the multiplexer 680 when the outputs of the horizontal expanding portion 640 and the second horizontal correlation detector 650 are both logic "1".

The input signal A is added to the 2H-delayed signal C by the fifth adder 660 and then amplified by the amplifier 670 by ½ to obtain an average value. The output of the amplifier 670 is supplied to a logic "1" input port of the multiplexer 680. The 1H-delayed input signal is supplied to a logic "0" input of the multiplexer 680. Accordingly, the multiplexer 680 selects the input signal on the basis of the output of the AND gate AN3 and produces the impulse noise-eliminated image signal. In other words, when the output of the AND gate AN3 is in logic "1" and the pixel in the noise width (range) is detected by the second horizontal correlation detector 650 and the horizontal expanding portion 640, the logic "1" input of the multiplexer 680 is selected and, thus, the average value of the signals of the pixels on the upper and lower lines delayed and matched is selectively outputted.

If the output of the AND gate AN3 is logic "0", this means that the noise is not detected and, therefore, the logic "0" input of the multiplexer 680 is selected so that the signal obtained by delay and matching the original input signal is outputted.

Figure 5:
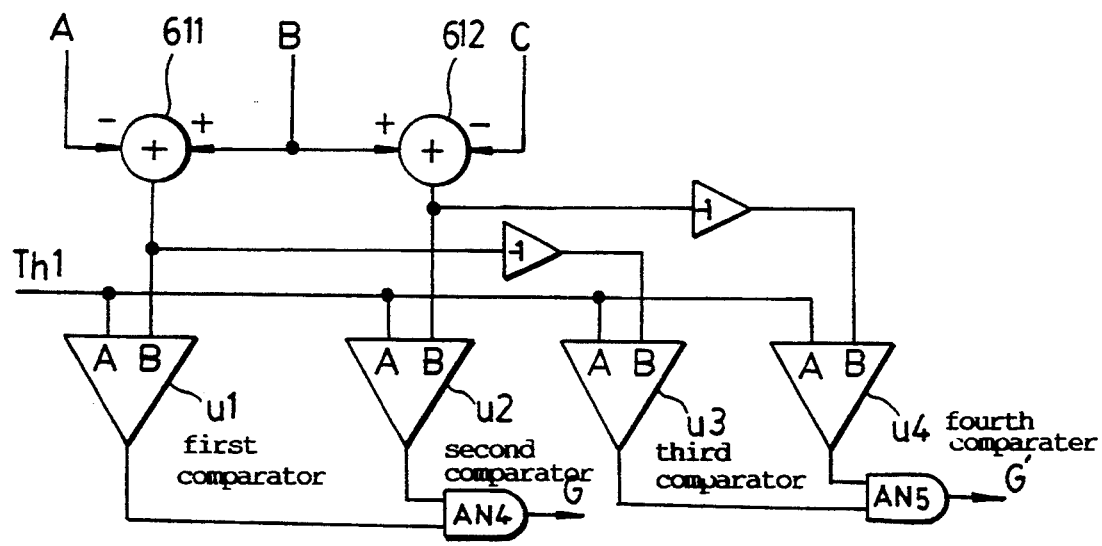
FIG. 5 is a block diagram of a vertical correlation detecting portion in FIG. 4.

FIG. 5 illustrates an example of the vertical correlation detector 610 shown in FIG. 4.

Referring to FIG. 5, for the noise having non-vertical correlation, sixth and seventh adders 611 and 612 are employed to obtain the difference between the 1H-delayed signal B of the pixel on the line to be processed presently and signals A and C on the upper and lower lines. The outputs of the sixth and seventh adders 611 and 612 and the signals obtained by multiplying the factor "−1" to the outputs of the adders 611 and 612 are compared with a threshold value Th1 by first to fourth comparators U1 to U4. As a result of the comparison, if the outputs of the adders 611 and 612 and the signals multiplied by the factor "−1" are equal to or higher than the threshold value Th1, the comparators U1 to U4 produce logic "1" outputs respectively. Alternatively, if the outputs of the adders 611 and 612 and the signals multiplied by the factor "−1" are lower than the threshold value Th1, the comparators U1 and U4 produce logic "0" outputs, respectively.

Figure 6:
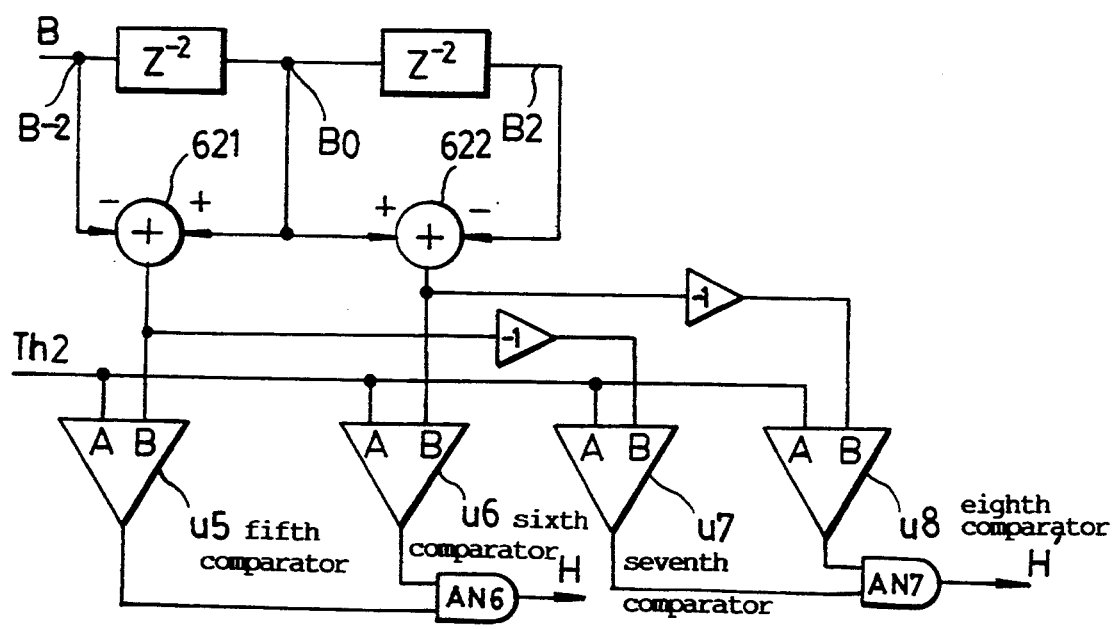
FIG. 6 is a block diagram of an example of a first horizontal correlation detecting portion in FIG. 4.

An AND gate AN4 produces a logic "1" output only when both outputs of the first and second comparators U1 and U2 become a logic "1", and an AND gate AN5 also produces a logic "1" output when outputs of the fifth and sixth comparators U5 and U6 both become a logic "1". Similarly, FIG. 6 shows an example of a first horizontal correlation detector 620 of FIG. 1, in which an AND gate AN6 produces a logic "1" output (H) when the outputs of fifth and sixth comparators U5 and U6 become a logic "1", and an AND gate AN7 produces a logic "1" output (H') when the outputs of the seventh and eighth comparators U7 and U8 become a logic "1" (FIG. 6).

Figure 7:
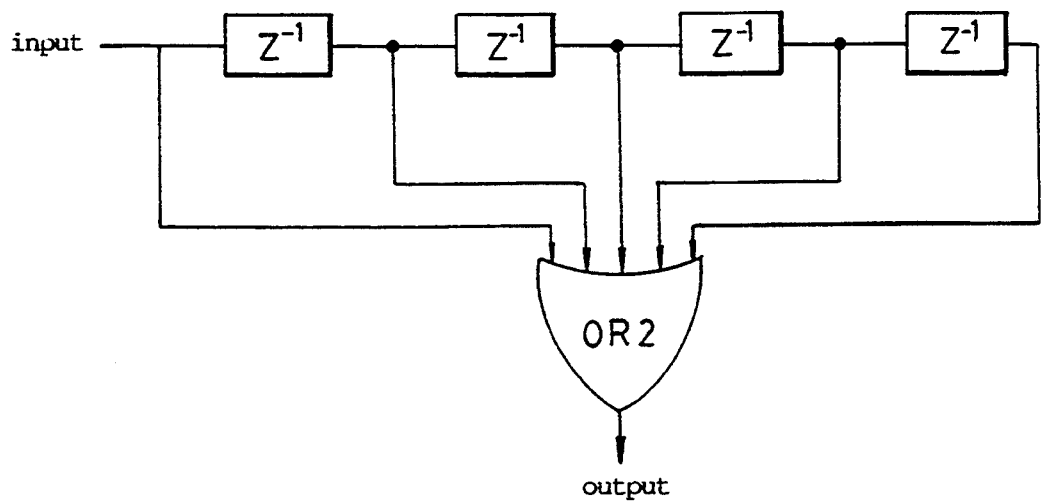
FIG. 7 is a block diagram of an example of a horizontal expanding portion in FIG. 4.

FIG. 7 is a block diagram of an example of the horizontal expanding portion 640 shown in FIG. 4.

Referring to FIG. 7, an OR gate OR2 outputs a logic "1" when at least one pixel of a logic "1" is presented in the pixels, that is, five pixels including four pixels located at the right and left sides of the output of the noise detector 630 of FIG. 4. The OR gate OR2 detects the noise by ORing five pixels including the output having noise component produced from the noise detector 630.

Figure 8:
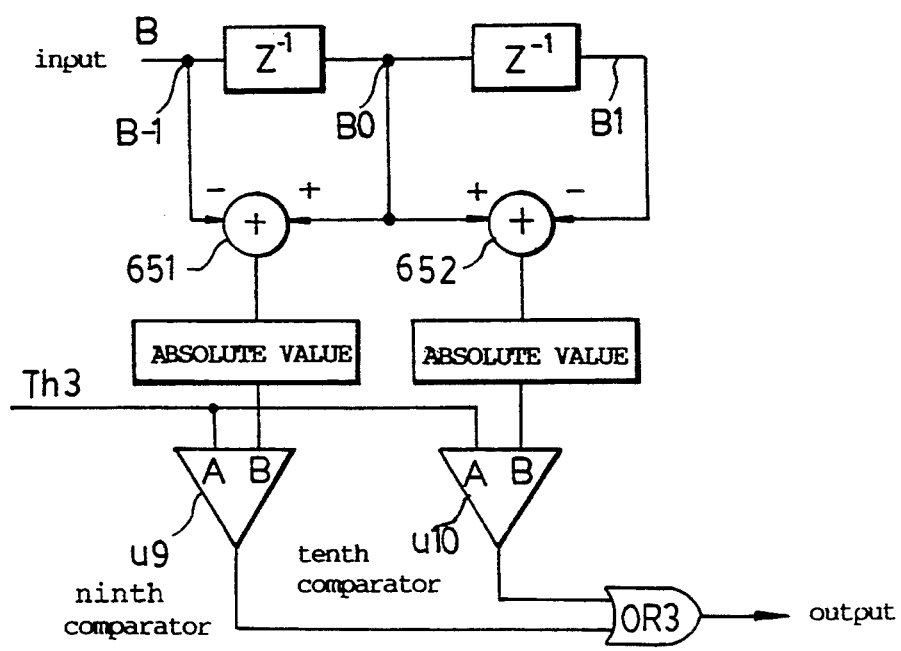
FIG. 8 is a block diagram of an example of a second horizontal correlation detecting portion in FIG. 4.

FIG. 8 illustrates a block diagram of an example of the second horizontal correlation detector 650 of FIG. 4.

Referring to FIG. 8, tenth and eleventh adders 651 and 652 serve to obtain the difference between the pixel B0 to be presently processed and the pixels B-1 and B1 before and after the pixel B0. Ninth and tenth comparators U9 and U10 are provided to compare the absolute value of the difference values from the adders 651 and 652 with a threshold value Th3. The comparators U9 and U10 produce logic 1 outputs respectively when the absolute value of the difference values is equal to or larger than the threshold value Th3, while they produce a logic "0" output respectively when the absolute value is lower than the threshold value Th3. An OR gate OR3 produces a logic "1" output when any one of the outputs of the comparators U9 and U10 becomes a logic "1".

As mentioned, according to a noise eliminating circuit of the present invention, the minute level noise in the high-frequency component of the image signal can be eliminated by the coring portion and the center of the noise in the low-frequency component is determined by the vertical and horizontal correlation to selectively remove the pixels corresponding to the noise component. Also, the noise processing region in the high-frequency component can be varied by the selection of the user, with a result that the picture quality can be optimumly maintained.

Although the present invention has been described with respect to the specified embodiment, it is to be understood that various changes and modifications may be made therein without departing from the spirit and the scope of the invention.

What is claimed is:

1. A noise eliminative circuit comprising:
   a plurality of high pass filters having different cut-off frequencies, respectively, for passing high-frequency components of an input image signal;
   a multiplexer for selectively outputting one of the input image signal and output signals of the respective high pass filters in accordance with a switch control portion;
   a coring circuit for receiving the selected output signal from the multiplexer and eliminating a minute noise level from the high-frequency component thereof;
   a first adder for removing the selected output signal from the multiplexer from the input image signal;
   an impulse noise eliminating circuit for eliminating an impulse noise from the image signal output from the first adder; and
   a second adder for adding the output signal of the impulse noise eliminating circuit and the output of the coring circuit to obtain an image signal in which noise is eliminated.

2. A noise eliminative circuit according to claim 1, wherein the coring circuit comprises an absolute value circuit for receiving the most significant bits of the selected output signal from the multiplexer, a level adjusting circuit for reducing an output level of the absolute value circuit by a coring level, a 0-level-and-below removing circuit for processing the signal below a 0 level of the level adjusting portion to be equal to 0, and a sign recovering circuit for recovering a sign of the signal of the 0-level-and-below removing circuit into a sign of the input signal, thereby providing an image signal in which minute noise level is reduced.

3. A noise eliminative circuit according to claim 1, wherein the impulse noise removing circuit comprises a vertical correlation detector for detecting a vertical correlation between lines from the output of the first adder and 1H and 2H delayed signals thereof to detect noise;
   a first horizontal correlation detector for detecting a horizontal correlation between the lines from the 1H delayed signal to detect black and white noises;
   a second horizontal correlation detector for receiving the 1H delayed signal to determine a presence of pixels in a band of the noise;
   a noise detector for logically calculating outputs of the vertical and first horizontal correlation detectors to obtain a center of the black and white impulse noises;
   a horizontal expanding portion for expanding a center of the impulse noise to determine a presence of pixels around a center of the noise;
   a third adder for delay-matching and adding the output of the first adder and the 2H delayed signal thereof;
   an amplifier for amplifying an output of the third adder to obtain an average value; and
   a multiplexer for receiving outputs of the second horizontal correlation detector and the horizontal expanding portion supplied through an AND gate as a selection signal, and outputting an image signal in which noise is removed from the signal defined by delay-matching an output of the amplifier and the 1H delayed signal of the input signal.

4. A noise eliminative circuit according to claim 3, wherein the vertical correlation detector comprises adder means for obtaining a difference between the 1H delayed signal of a pixel on a line to be presently processed and signals of upper and lower lines;
   comparators for comparing outputs of the adder means and a signal obtained by multiplying a factor "$-1$" to the outputs of said adder means with a threshold value; and
   an AND gate for detecting black and white noises from outputs of said comparators.

5. A noise eliminative circuit according to claim 3, wherein the first horizontal correlation detector comprises first and second adder means for obtaining a difference between the pixel to be presently processed and pixels before and after the pixel;
   comparators for comparing the output of the first and second adder means and a signal obtained by multiplying a factor "$-1$" to the outputs of the first and second adder means with a threshold value; and
   an AND gate for detecting a possibility of black and white noises from the outputs of the comparators.

6. A noise eliminative circuit according to claim 3, wherein the horizontal expanding portion comprises an OR gate for expanding the center of the noise output from the noise detector by two pixels on both the right and left sides respectively to determine the presence of noise.

7. A noise eliminative circuit according to claim 3, wherein the second horizontal correlation detector comprises adder means for obtaining a difference between the pixel to be presently processed and pixels before and after the pixels;
   comparators for comparing absolute values of the differences from the adder means with a threshold value; and
   an OR gate for outputting a horizontal correlation detected from the outputs of the comparators.

* * * * *